April 19, 1932.  W. L. ROBINSON  1,854,603

PRESSURE FUEL OIL FEED SYSTEM FOR OIL ENGINES

Filed May 3, 1930  2 Sheets-Sheet 1

Inventor

W. L. Robinson

By Clarence A. O'Brien,
Attorney

April 19, 1932.  W. L. ROBINSON  1,854,603

PRESSURE FUEL OIL FEED SYSTEM FOR OIL ENGINES

Filed May 3, 1930  2 Sheets-Sheet 2

Inventor
W. L. Robinson
By Clarence A. O'Brien
Attorney

Patented Apr. 19, 1932

1,854,603

UNITED STATES PATENT OFFICE

WILLIE L. ROBINSON, OF MARTHA, OKLAHOMA

PRESSURE FUEL OIL FEED SYSTEM FOR OIL ENGINES

Application filed May 3, 1930. Serial No. 449,664.

This invention relates to new and useful improvements in feeding fuel oil to the fuel injector pump of heavy duty oil pumps.

A primary object of the invention is to provide an improved fuel oil feeding system of the above mentioned character especially adapted for preventing the accumulation of air in the fuel oil injector governor pump of a well known type of heavy duty oil engines.

Other objects and advantages of the invention will become apparent during a study of the following description, taken in connection with the accompanying drawings, wherein.

Figure 1:
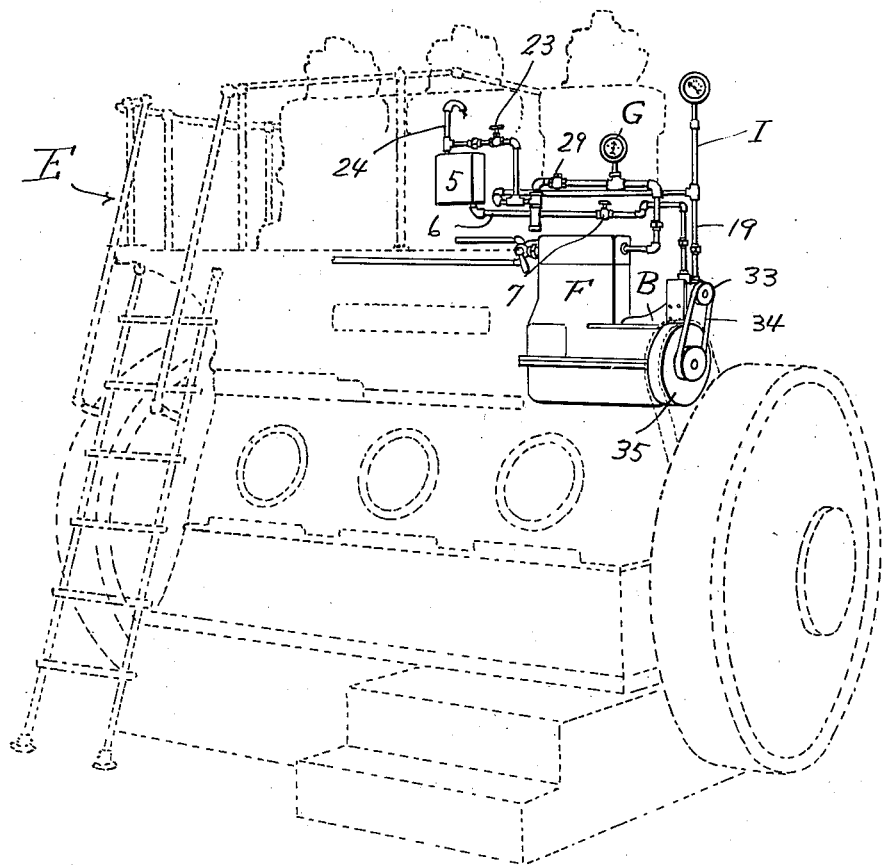
Figure 1 is a perspective view of my improved feed system, the same being shown as applied to a heavy duty oil engine.

Referring more in detail to the drawings it will be seen that in carrying out my improved system, instead of connecting the regular feed pipe from the bottom of the fuel oil reservoir chamber 5 directly to the fuel oil injection governor pump F I provide a suction line or fuel conduit 6 which leads from the bottom of the reservoir 5 to a pump designated generally by the reference character P.

The pump P is of a well known type of rotary geared pump. Arranged in the conduit 6 is a manually operable control valve 7. Forming a part of the conduit, and leading from one side of the valve 7 is a riser 8 from which leads a horizontally disposed pipe 9 in turn suitably coupled to a downwardly depending pipe 10 which leads into the top of an oil filtering trap designated generally by the reference character 11. Leading laterally from one side of the trap 11 is a conduit 15 which leads to the suction pipe arrangement 16 of the pump P.

Figure 5:
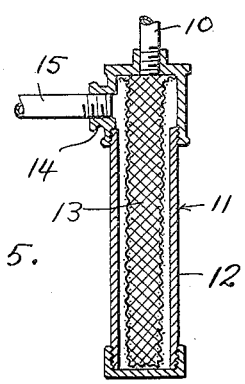
Figure 5 is a longitudinal sectional view taken through a trap embodying a part of the improved system.
Figure 3:
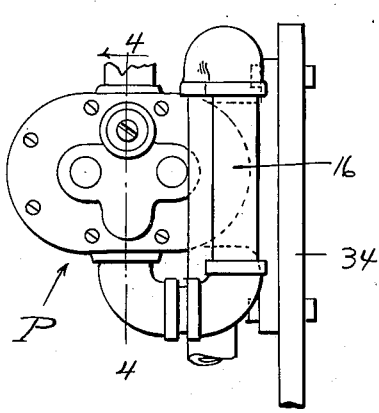
Figure 3 is a fragmentary detail of a feed pump embodied in my improved system.
Figure 4:
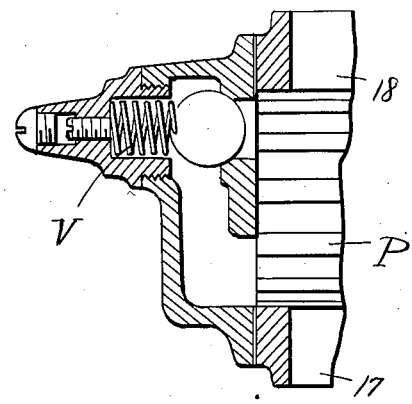
Figure 4 is a fragmentary detail sectional view taken substantially on the line 4—4 of Figure 3.
Figure 2:
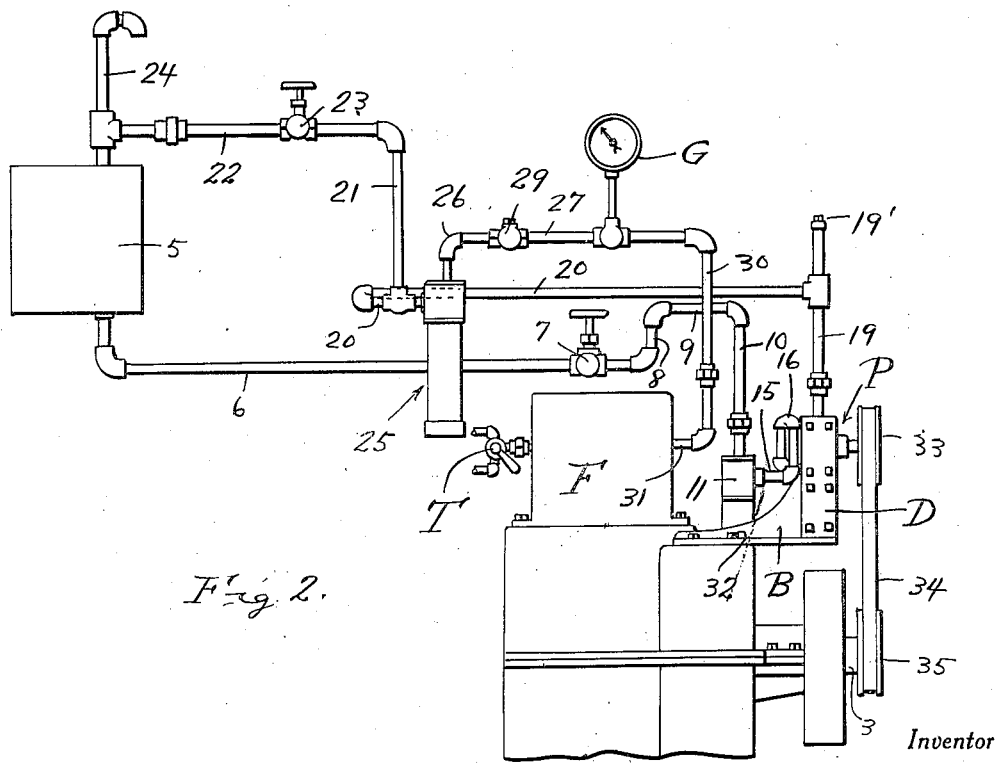
Figure 2 is an elevational view of my improved system, the same being shown somewhat diagrammatically.

The trap 11 comprises a tubular casing 12 closed at its upper and lower ends through the medium of suitable caps, the upper cap of which is provided with an inlet nipple into which is threaded the lower end of the pipe 10, said upper cap being also provided with an outlet nipple 14 into which is threaded one end of the pipe 15. (See Figure 5).

A force feed conduit leads from the top of the pump P to the top of the fuel reservoir chamber 5. The said conduit includes a pipe 19 suitably coupled to and leading from the top of the pump P. A pipe 20 branches from the pipe 19 and at its end terminates in a pipe 20' leading to a second trap designated generally by the reference character 25.

The second trap 25 is identical in construction with the trap 11. A pipe 21 leads upwardly from the pipe 20' and has suitable elbow connection with a pipe 22 leading to and communicating with a vent pipe 24 rising from the top of the chamber 5. Arranged in the pipe 22 is a manually operable valve 23.

The above referred to force feed conduit includes a branch of which pipe 20 and trap 25 are a part of said branch. Completing this branch is a pipe 27 suitably coupled as at 26 with the top of the filtering trap 25. At its other end the pipe 27 has elbow connection with a vertically disposed pipe 30. The pipe 30 at its lower end has suitable elbow connection with an intake pipe 31 leading laterally from the pump F. Arranged in the pipe 27 is a check valve 29.

On the opposite side of the pump F is a three way valve T forming a part of the usual feed system of the oil engine, and in this connection then it will be noted that in the present system comprehended by this invention feed to the pump F is on the opposite side of the pump from the point of injection in the regular equipment, that is to say, that the inlet and outlet of the injection pump are diametrically opposite to one another, instead of being at right angles to one another as was formerly the case.

From the foregoing then it will be seen that as comprehended by the present system during operation of the pump P oil is drawn by suction directly from the fuel oil reservoir chamber to said pump P and from said pump forced upwardly through the force feed conduit to the top of said reservoir, the oil passing through and being filtered in the trap 11 through the medium of the filtering screen 13 arranged in the trap. During the drawing of the fuel from the reservoir, the three way valve T is closed while the needle valve 23 may be partly closed whereby is provided a back pressure thrown against the fuel oil injection governor pump F. During this operation of the system air is exhausted through the vent 24 thereby eliminating the accumulation of air in the fuel oil injection pump as was the difficulty experienced in former systems which accumulation of air created a back pressure that broke the fuel oil and caused the engine to miss firing.

Furthermore, in my system, it will be noted that before the fuel oil can enter the fuel oil injection governor pump F it is passed by the back pressure first referred to through the trap 25 of the branch of the force feed conduit where the oil is again filtered and from said filtering trap 25 the oil passes through the check valve 29 to finally pass into the ejection pump F. The passage of the oil through the check valve 29 will further maintain pressure against the fuel oil while the engine is at rest, thus eliminating any possibility of air accumulating while the engine is at rest.

Preferably to accomplish this purpose the release valve V of the pump P is set at a working pressure of eight pounds and the needle valve 29 is set at a working pressure of five pounds, thus eliminating any possibility of any over accumulation of pressure at the firing nozzle; this pressure being registered by a suitable gauge G associated with the pipe 27 but no pressure can be accumulated above eight pounds, the working point of the release valve on the rotary pump.

It will be further noted, that the pump P comprises among other parts a pulley 33 over which is trained a belt 34, which belt 34 is in turn trained over a pulley 35 carried at the end of the governor shaft, so that it will be seen that the rotary gear pump P is driven from the injection pump F for creating the necessary pressure to force the fuel oil through the system.

Should in any event, the system require priming any time before starting, this can be accomplished by removing the plug 19' normally closing the upper end of the pipe 19.

As a substitute for the plug, and as suggested in Figure 1, a suitable gauge I may be utilized therefor. The pump P is suitably supported on the engine E through the medium of a bracket B, of somewhat angular construction suitably bolted on top of the inspection plate at the top of the governor housing, as is apparent.

To the bracket B is suitably attached a hanger D to which in turn is suitably secured the pump P. It may be well to mention here that in the original equipment, fuel oil was taken from the bottom of the fuel oil reservoir chamber direct to the three way valve T at the left of the fuel oil injection pump F. The oil was supplied in this manner to the governor pump by gravity flow and by this system, the air passes through the fuel oil and is accumulated in the governor pump, forming air pockets that broke the flow of stream of fuel oil, causing the engine to miss firing.

To elminate this, it was necesary to frequently stop the engine, disconnect the fuel line from the nozzle, and pump out the accumulated air, which manifestly caused quite a loss of time and no small amount of inconvenience not to mention the financial loss caused by such delay.

Through the medium of my invention such accumulation of air in the injector pump is safeguarded against, and has been further found to overcome the aforementioned defects of the former system used in the regular equipment, my invention fully illustrating its capability and advantages while operating under actual working conditions.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. Means for supplying liquid free of foreign matter and air to a member in combination with a reservoir containing the liquid, a pump, a conduit connecting the inlet of the pump to the reservoir, a filter chamber, a conduit connecting the outlet of the pump to said chamber, a conduit connecting the last-mentioned conduit with the top of the reservoir, a control valve in the third conduit, a vent pipe connected with the third conduit for venting air therefrom, a fourth conduit connecting the discharge of the filter chamber to said member and a control valve in said fourth conduit.

2. Means for supplying liquid free of foreign matter and air to a member in combination with a reservoir containing the liquid, a pump, a conduit connecting the inlet of the pump to the reservoir, a filter chamber, a conduit connecting the outlet of the pump to said chamber, a conduit connecting the last-mentioned conduit, a vent pipe connected with the third conduit for venting air therefrom, a fourth conduit connecting the discharge of the filter chamber to said member and a control valve in said fourth conduit, and said pump having a by-pass passage therein and a spring controlled valve in the by-pass.

In testimony whereof I affix my signature.

WILLIE L. ROBINSON.